US009256556B2

(12) United States Patent
Maeda

(10) Patent No.: US 9,256,556 B2
(45) Date of Patent: Feb. 9, 2016

(54) RAM MEMORY DEVICE CAPABLE OF SIMULTANEOUSLY ACCEPTING MULTIPLE ACCESSES

(71) Applicant: Tomoyuki Maeda, Tokyo (JP)

(72) Inventor: Tomoyuki Maeda, Tokyo (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 267 days.

(21) Appl. No.: 13/653,141

(22) Filed: Oct. 16, 2012

(65) Prior Publication Data

US 2013/0104004 A1 Apr. 25, 2013

(30) Foreign Application Priority Data

Oct. 21, 2011 (JP) ................................. 2011-231550

(51) Int. Cl.
*G06F 13/00* (2006.01)
*G06F 13/16* (2006.01)
*G06F 12/08* (2006.01)
*G06F 3/06* (2006.01)
*G06F 12/06* (2006.01)

(52) U.S. Cl.
CPC .............. *G06F 13/16* (2013.01); *G06F 3/0601* (2013.01); *G06F 3/0679* (2013.01); *G06F 3/0688* (2013.01); *G06F 12/0623* (2013.01); *G06F 12/0831* (2013.01); *G06F 13/1642* (2013.01); *G06F 13/1673* (2013.01)

(58) Field of Classification Search
CPC ... G06F 3/0601; G06F 3/0679; G06F 3/0688; G06F 12/0623; G06F 12/0831; G06F 13/1642; G06F 13/1673

USPC .......... 711/104, 111, 149; 710/112, 305, 310; 712/29, 225; 713/400, 500; 714/731, 714/744, 768
See application file for complete search history.

(56) References Cited

U.S. PATENT DOCUMENTS

| | | | | |
|---|---|---|---|---|
| 5,448,714 | A * | 9/1995 | Stodieck ........................ | 711/149 |
| 7,277,995 | B2 * | 10/2007 | Davies et al. .................. | 711/154 |
| 7,685,356 | B2 * | 3/2010 | Mukaida ........................ | 711/103 |
| 7,752,380 | B2 * | 7/2010 | Avraham et al. ............... | 711/103 |
| 7,827,431 | B2 * | 11/2010 | Fujimoto ....................... | 713/501 |

(Continued)

FOREIGN PATENT DOCUMENTS

| | | |
|---|---|---|
| JP | 05-074151 A | 3/1993 |
| JP | H06-161870 A | 6/1994 |

(Continued)

OTHER PUBLICATIONS

An Office Action; "Notice of Rejection," issued by the Japanese Patent Office on May 12, 2015, which corresponds to Japanese Patent Application No. 2011-231550 and is related to U.S. Appl. No. 13/653,141; with English language translation.

*Primary Examiner* — Reba I Elmore
(74) *Attorney, Agent, or Firm* — Studebaker & Brackett PC

(57) ABSTRACT

A RAM memory device includes a selection unit that supplies the access reaching one of two interfaces to a RAM in one cycle of a clock signal in response to a control signal. The RAM memory device also includes a storage unit that stores another access that has reached the other of the two interfaces at least till the next cycle following the above-mentioned one cycle in response to the control signal. The selection unit supplies the above-mentioned another access from the storage unit to the RAM in or after the above-mentioned next cycle.

17 Claims, 7 Drawing Sheets

(56) References Cited

U.S. PATENT DOCUMENTS

| | | | |
|---|---|---|---|
| 2002/0172081 A1* | 11/2002 | Mukaida et al. | 365/200 |
| 2003/0126451 A1* | 7/2003 | Gorobets | 713/189 |
| 2004/0193774 A1* | 9/2004 | Iwata et al. | 711/1 |
| 2005/0021918 A1* | 1/2005 | Hwang et al. | 711/163 |
| 2005/0050283 A1* | 3/2005 | Miller | G06F 9/526 711/150 |
| 2006/0176068 A1* | 8/2006 | Holtzman et al. | 324/765 |
| 2006/0179214 A1* | 8/2006 | Kitamura | 711/111 |
| 2006/0214009 A1* | 9/2006 | Shikata et al. | 235/492 |
| 2007/0028037 A1* | 2/2007 | Kang | 711/104 |
| 2008/0098164 A1* | 4/2008 | Lee et al. | 711/103 |
| 2008/0189555 A1* | 8/2008 | Sohn | 713/192 |
| 2009/0083476 A1* | 3/2009 | Pua et al. | 711/103 |
| 2010/0037001 A1* | 2/2010 | Langlois et al. | 711/103 |
| 2010/0274933 A1* | 10/2010 | Wang | 710/22 |
| 2011/0022777 A1* | 1/2011 | Moshayedi | 711/103 |

FOREIGN PATENT DOCUMENTS

| | | |
|---|---|---|
| JP | 08-077066 A | 3/1996 |
| JP | 2010-140155 A | 6/2010 |

* cited by examiner

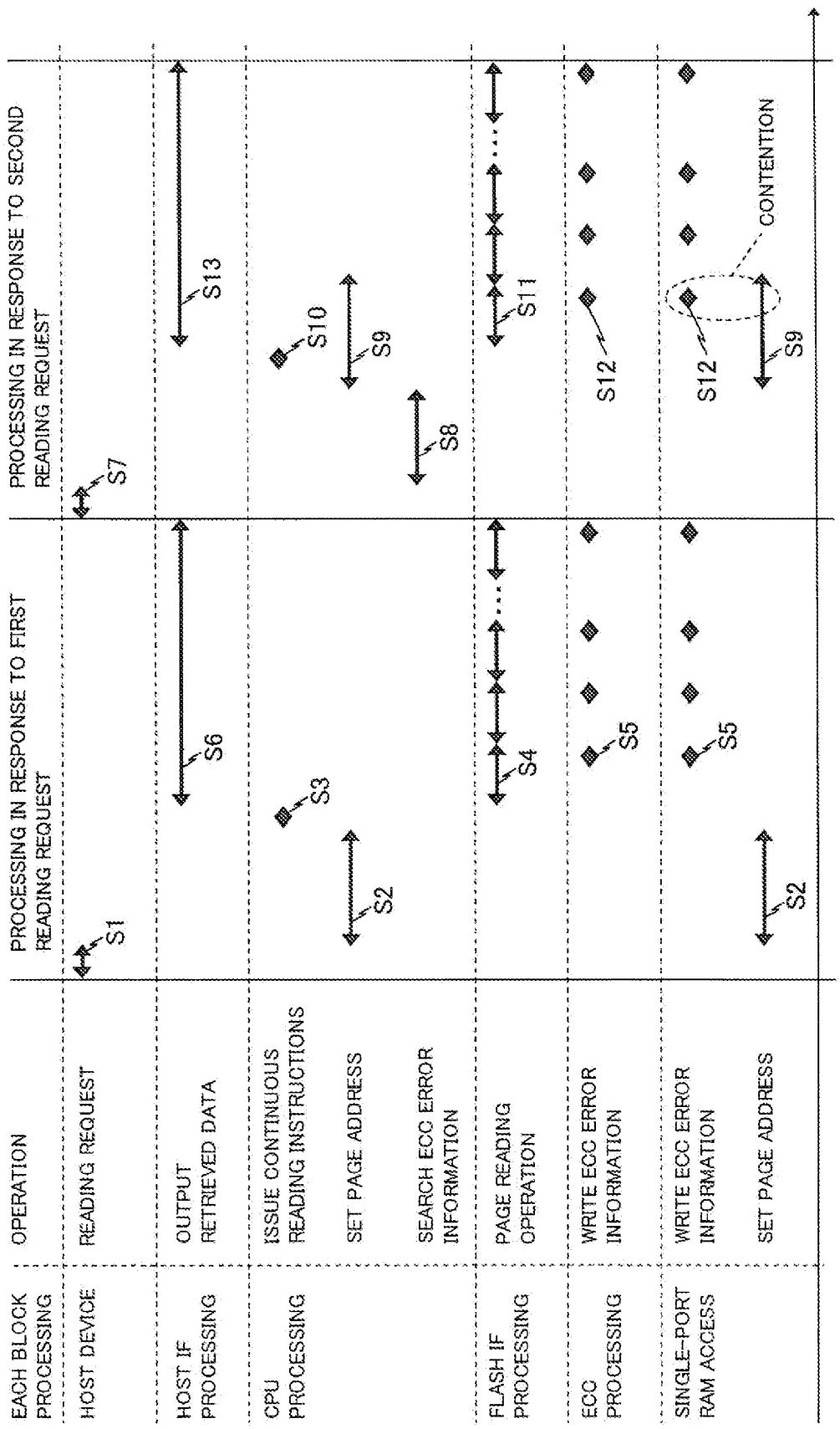

RAM MEMORY DEVICE CAPABLE OF SIMULTANEOUSLY ACCEPTING MULTIPLE ACCESSES

TECHNICAL FIELD

The present invention generally relates to a RAM (random access memory) device that is included in a memory control device configured to control a semiconductor memory unit, such as a flash memory, and more particularly to such RAM memory device that enables writing and/or reading in response to a plurality of accesses.

DESCRIPTION OF RELATED ART

A memory control device such as a flash controller that controls a semiconductor memory unit, for example, a flash memory, is known in the art. For example, such flash controller is disclosed in Japanese Patent Application Publication (Kokai) 8-77066. For the flash controller, generally, an ECC (Error Check and Correct) device, i.e., error detection and correction circuit is used to improve reliability of data retrieved from a flash memory.

When a data error occurs, data correction is performed by the ECC circuit. The error information is stored in a register or a RAM. The error information may later be used when rewriting of the data is needed, or it may be used as log information of the error occurrence.

It is also known in the art that signal requests such as access to the RAM compete (contend) with each other, for example, when the error information is temporarily stored in the RAM of a memory control device. For example, Japanese Patent Application Publication (Kokai) 5-74151 discloses an emulation circuit for a dynamic memory, which is used when a refresh request signal and a direct memory access request signal to a memory contend with each other.

SUMMARY OF THE INVENTION

When a single-port RAM is used as a writing destination of error information and the writing access of the error information to the RAM and another access to the same RAM contend with each other, only one of the two accesses is enabled. If the writing destination of error information is the register in a CPU, the access contention does not occur but the circuit area increases, as compared with when the writing destination is a RAM. For example, when it is necessary to store 1 KB (kilobytes) of data, including the addresses of a plurality of pages and error information retrieved from a flash memory, then the circuit area is about four times as large as the configuration using a RAM.

An object of the present invention is to provide a RAM memory device that can accept two accesses even if access competition to a RAM occurs.

According to one aspect of the present invention, there is provided a RAM memory device which includes two interfaces. Each of the two interfaces relays an access including a control signal for writing or reading and information data. The RAM memory device also includes a RAM that writes or reads the information data in synchronization with a clock signal, based on the access passing through the interface concerned. The RAM memory device also includes a selection unit that performs a selective supply operation for supplying a first access, which has reached one of the two interfaces, to the RAM in one cycle of the clock signal, in response to the control signal concerned. The RAM memory device also includes a storage unit for storing a second access that has reached the other of the two interfaces, at least till the next cycle following the above-mentioned "one cycle" (or preceding cycle) in response to the control signal concerned. The selection unit supplies the second access from the memory unit to the RAM in or after the above-mentioned "next cycle."

The RAM may be a single-port RAM.

The RAM memory device of the present invention accepts two accesses and responds to these accesses, even if access competition to the RAM occurs.

According to another aspect of the present invention, there is provided a memory control device connected between a host device and a memory unit for writing and reading data to and from the memory unit in response to a request from the host device. The memory control device includes a host interface that interfaces to the host device, a memory interface that interfaces to the memory unit, and a RAM device connected between the host interface and the memory interface.

These and other objects, aspects and advantages of the present invention will become apparent to those skilled in the art from the following detailed description when read and understood in conjunction with the appended claims and drawings.

BRIEF DESCRIPTION OF THE DRAWINGS

FIG. 5 is a time chart illustrating the operation of the flash controller of FIG. 1 when responding to a reading request.

DETAILED DESCRIPTION OF THE INVENTION

Now, embodiments of the present invention will be described in detail with reference to the accompanying drawings.

Figure 1:
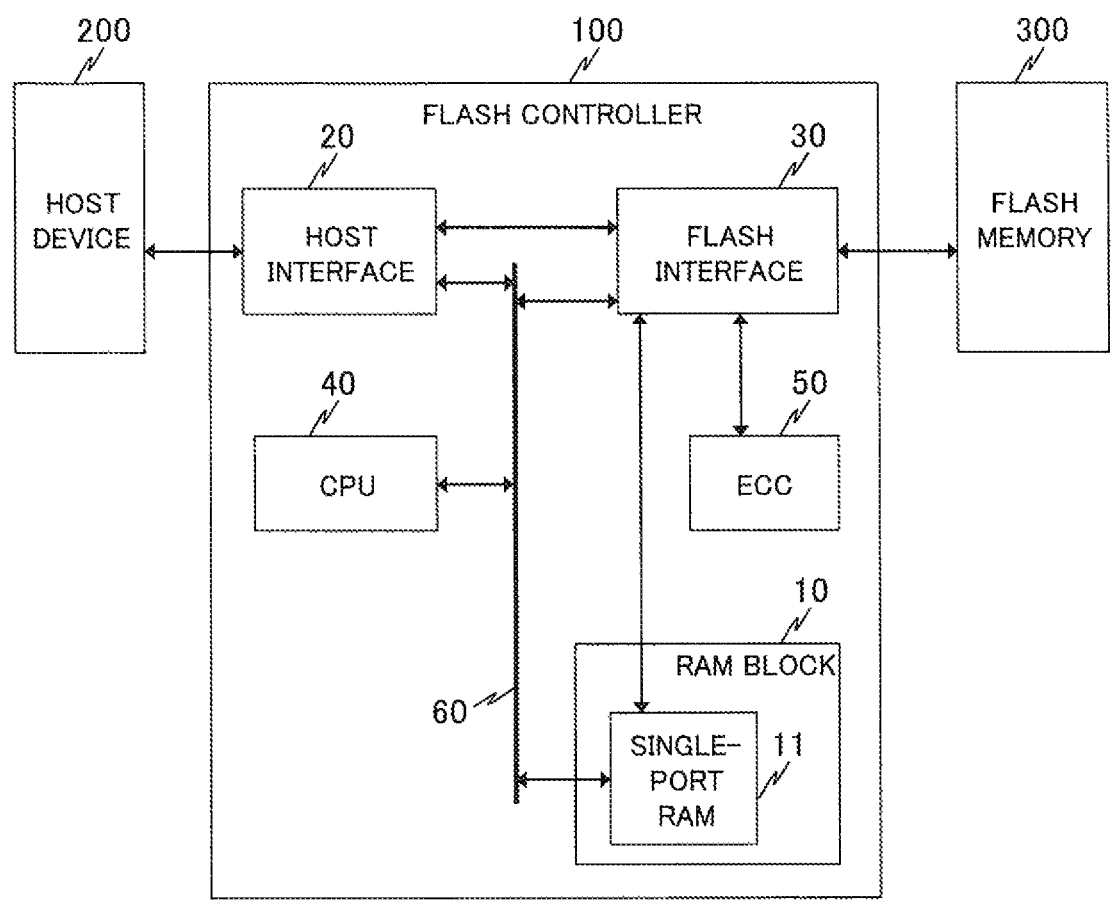
FIG. 1 is a block diagram illustrating a flash controller including a RAM memory device (RAM block) connected between a host device and a flash memory according to one embodiment of the present invention.

Referring to FIG. 1, the configuration of a memory control device 100 will be described. The memory control device 100 may be referred to as a flash controller 100 because the memory control device 100 controls a flash memory 300. The flash controller 100 includes a RAM memory device 10 (hereafter, referred to as a RAM block 10). The memory control device 100 is connected between a host device 200 and a semiconductor memory device 300. In this embodiment, the semiconductor memory device 300 is the flash memory 300.

The flash controller 100 writes data (hereafter, referred to as writing) onto the flash memory 300, and reads data (hereafter, referred to as reading) from the flash memory 300, in response to a request from the host device 200.

The flash controller 100 is further described hereafter.

The RAM block 10 is used as a buffer for data-to-be-written when data is written in the flash memory 300. The RAM block 10 is used as a storage area storing a plurality of page addresses, which are used to continuously read a plurality of pages from the flash memory 300, when data is read from the flash memory 300. The RAM block 10 has a single-port RAM 11. The single port RAM 11 can write or read data in synchronization with a clock signal, in response to writing or reading access. A control signal and information data for writing or reading are included in the corresponding access. The operation of the single-port RAM 11 is described below with reference to FIG. 2.

A host interface 20 is an interface located (connected) between the flash controller 100 and the host device 200. For example, the host interface 20 receives a writing request or a reading request from the host device 200 and passes the request to the CPU 40. The host interface 20 transmits data that is read (retrieved) from the flash memory 300 to the host device 200. The host interface 20 sends the data-to-be-written, which is received from the host device 200, to a flash interface 30.

The flash interface 30 is an interface connected between the flash controller 100 and the flash memory 300. For example, the flash interface 30 writes data into the flash memory 300 and reads data from the flash memory 300. The flash interface 30 passes the data from the flash memory 300 to an ECC circuit 50. The flash interface 30 sends the data, after undergoing error detection/correction by the ECC circuit 50, to the host interface 20.

The CPU 40 receives a writing request or a reading request from the host interface 20 and controls the flash interface 30 and the RAM block 10 in response to the request. For example, the CPU 40 allots page addresses to addresses in the single-port RAM 11 of the RAM block 10 in response to the reading request. The CPU 40 may send continuous reading instructions, accompanied by the number of pages to be read (how many pages to be read), to the flash interface 30. The CPU 40 may detect error information stored in the single-port RAM 11. These operations will be described in detail below with reference to FIG. 5.

The ECC circuit 50 performs error detection/correction on the data passed from the flash interface 30. Specifically, the ECC circuit 50 allots a parity bit, for detection of error, to the data when the data passed from the flash interface 30 is data-to-be-written. The ECC circuit 50 performs error detection and error correction on the data when the passed data is retrieved data. The ECC circuit 50 accesses the RAM block 10 and memorizes (writes) the error information showing the result of error detection to a corresponding address in the single-port RAM 11, upon finishing the error detection/correction on one page worth of retrieved data.

An internal bus 60 is a communication path for communication between the RAM block 10, the host interface 20, the flash interface 30, and the CPU 40.

Figure 2:
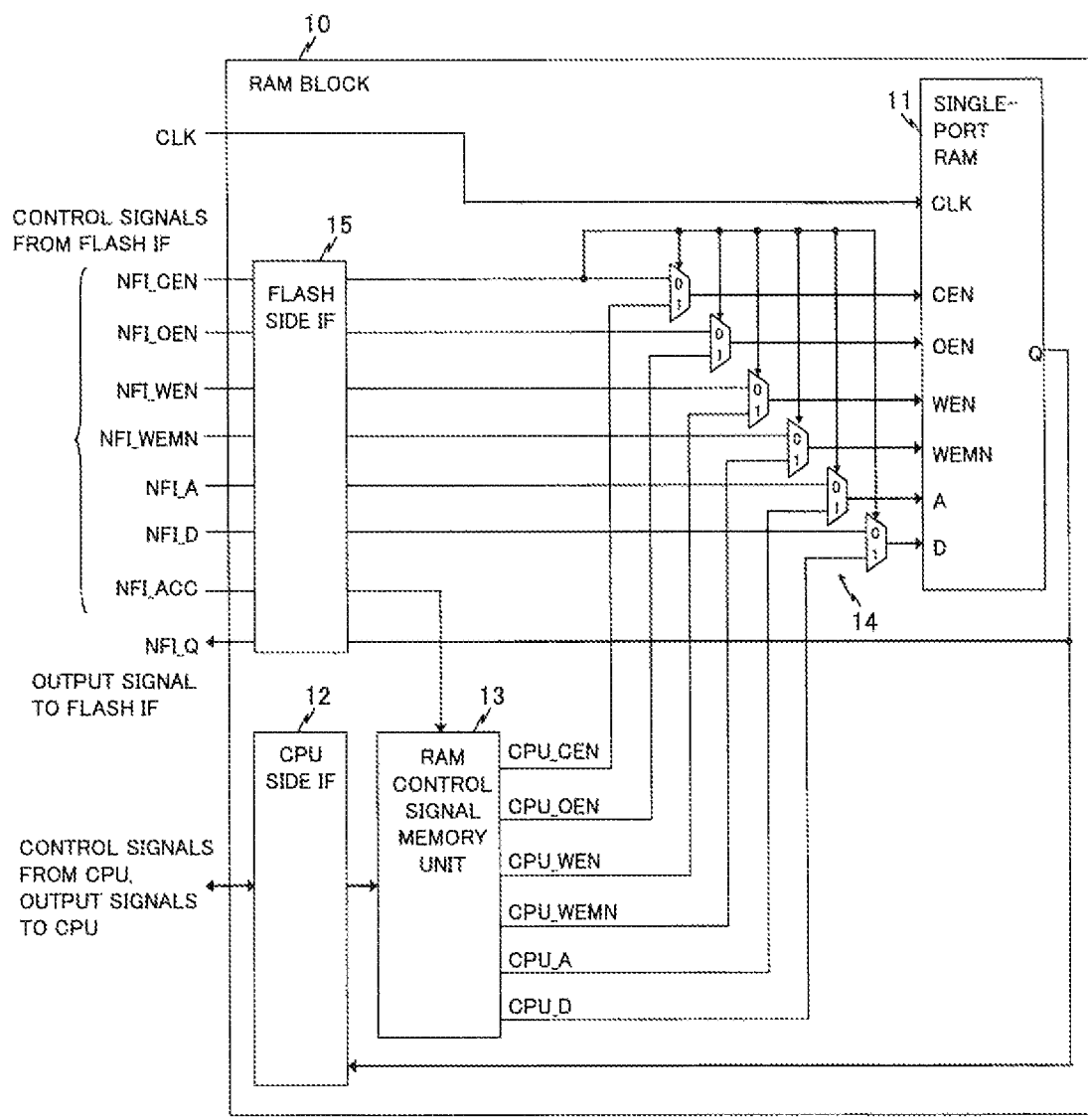
FIG. 2 is a block diagram showing an exemplary configuration of the RAM block shown in FIG. 1.

FIG. 2 illustrates an exemplary configuration of the RAM block 10. The RAM block 10 may receive a RAM control signal from the flash interface 30 and another RAM control signal from the CPU 40. In FIG. 2, "interface" is represented by "IF."

The CPU side interface 12 is an interface that can receive a second access for writing or reading from the CPU 40. The CPU side interface 12, i.e., the memory side interface, also has a function of changing (modifying) the data format of the access from the CPU 40 into an appropriate data format for the single-port RAM 11.

A RAM control signal memory unit 13 temporarily stores the RAM control signal received by the CPU side interface 12, in response to a memory circuit control signal NFI_ACC supplied from the flash interface 30.

A multiplexer 14 has two input pins and selects one of two RAM control signals, i.e., the RAM control signal from the flash interface 30 or the RAM control signal stored in the RAM control signal memory unit 13. Then, the multiplexer 14 supplies the selected RAM control signal to the single-port RAM 11. The multiplexer 14 selects one of the two RAM control signals in response to an NFI_CEN signal supplied from the flash interface 30. It should be noted that the multiplexer 14 may be called a selecting unit. Likewise, the NFI_CEN signal may be called a selection instruction signal.

The flash side interface 15 is an interface that can receive a first access for writing or reading from the flash interface 30.

The RAM control signals include CEN, OEN, WEN, WEMN, A, and D. In the embodiment shown in FIG. 2, "NFI_" is attached to the head of the signal name if the signal comes from the flash interface 30, and "CPU_" is attached to the head of the signal name if the signal comes from the CPU 40.

The single-port RAM 11 is a synchronization RAM that operates in synchronization with a clock signal CLK. The rising edge of the clock signal CLK, for example, is used for synchronization. The single-port RAM 11 writes data at a designated address and/or reads data from the designated address, in response to the RAM control signal supplied from the multiplexer 14.

Figure 3:
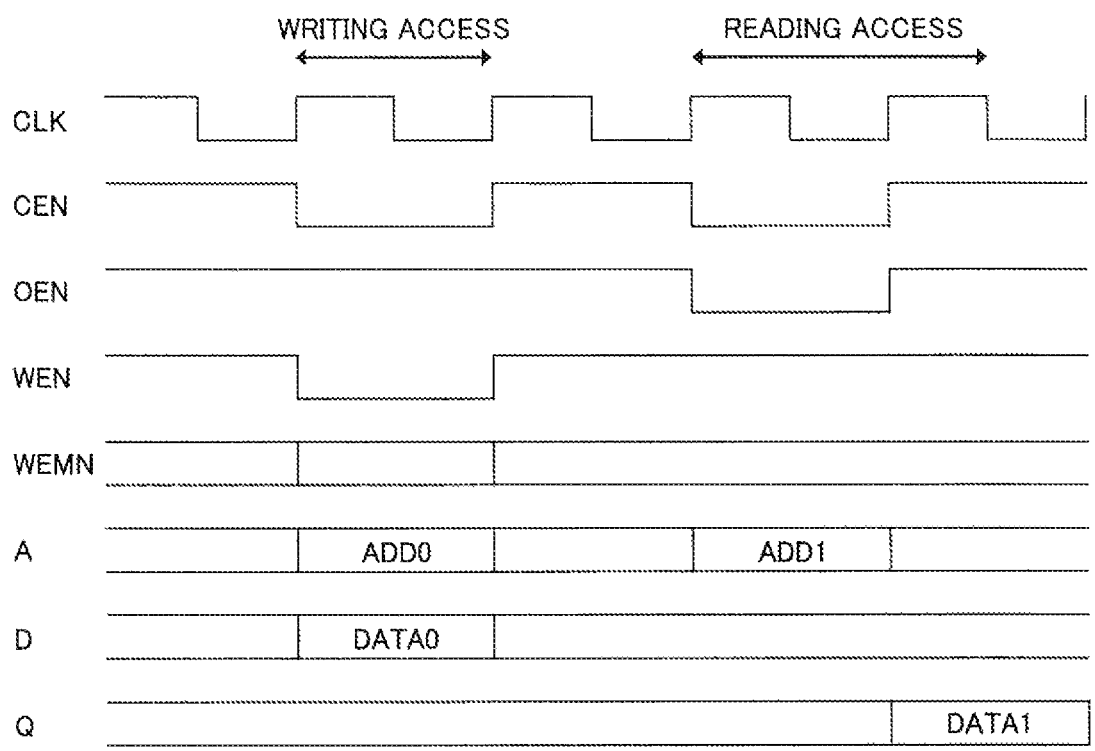
FIG. 3 is a time chart illustrating access waveforms when writing and reading take place in a single-port RAM shown in FIG. 1.

FIG. 3 illustrates access waveforms when data is written in or read from the single-port RAM 11.

The writing access become effective upon asserting (making effective) a chip enable signal CEN and a write enable signal WEN. During this asserting process, data DATA0 indicated by the data signal D is written in the area ADD0 designated by an address signal A in synchronization with the clock signal CLK.

A write enable mask signal WEMN is a signal for masking the data-to-be-rewritten in the unit of byte. Use of the write enable mask signal WEMN makes it possible to write error information at the same address as the data of the page address, while maintaining the data of the page address, which has been written prior to the writing of the error information. By writing the error information at the same address as the page address, the CPU 40 can quickly search the error information.

The read access becomes effective upon asserting the chip enable signal CEN and an output enable signal OEN. During this asserting process, an output signal Q representing the data DATA1 stored in the area ADD1 designated by an address signal A is generated in synchronization with the clock signal CLK. The data DATA1 is generated in a cycle after the cycle in which the ADD1 is designated.

The single-port RAM 11 supplies the output signal Q to the flash interface 30, as an output signal NFI_Q (FIG. 2). The single port RAM 11 supplies the output signal Q to the CPU 40 through the CPU side interface 12.

Figure 4:
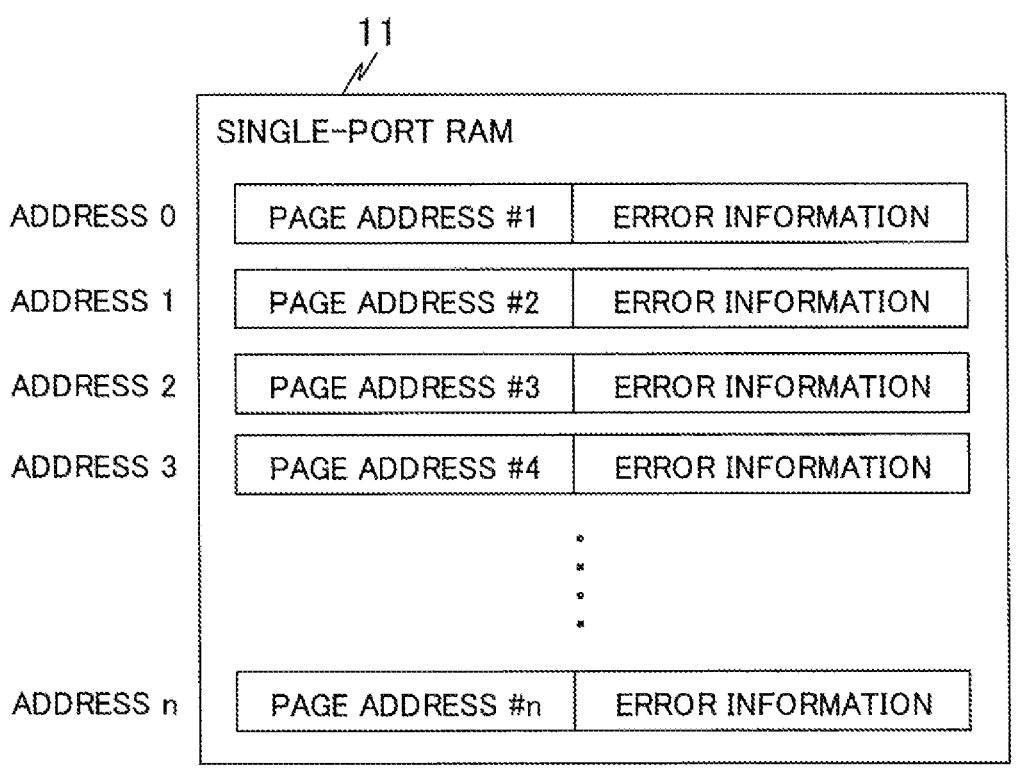
FIG. 4 illustrates an exemplary set of data that is stored in the single-port RAM of FIG. 1.
Figure 6A:
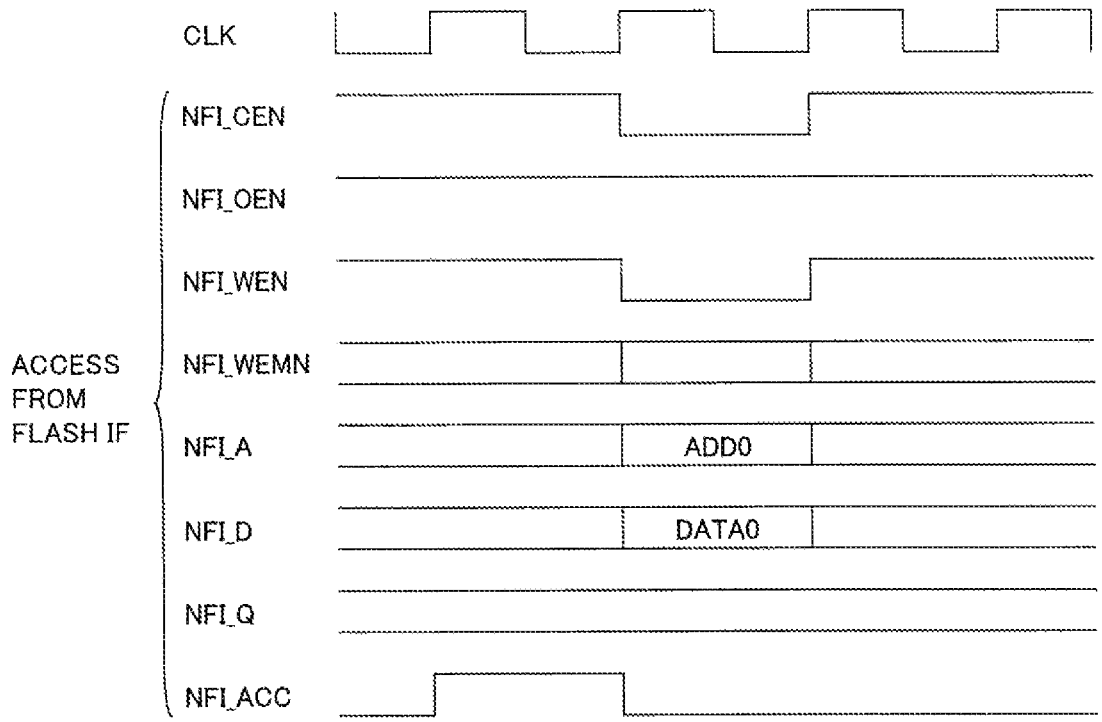
FIG. 6A is a time chart illustrating an access waveform from a flash interface, when writing access contention occurs to the single-port RAM.
Figure 6B:
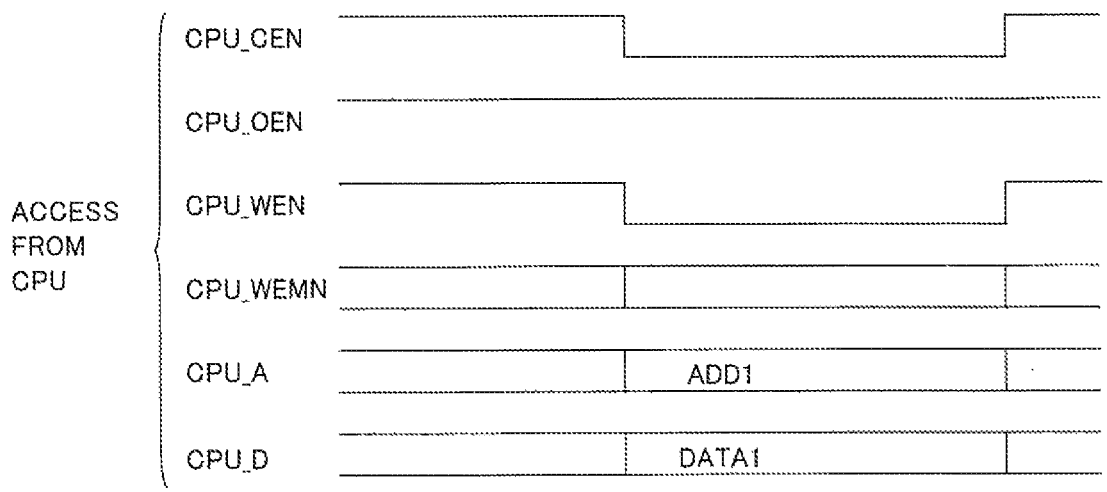
FIG. 6B is a time chart illustrating an access waveform from a CPU, when writing access contention occurs to the single-port RAM.
Figure 6C:
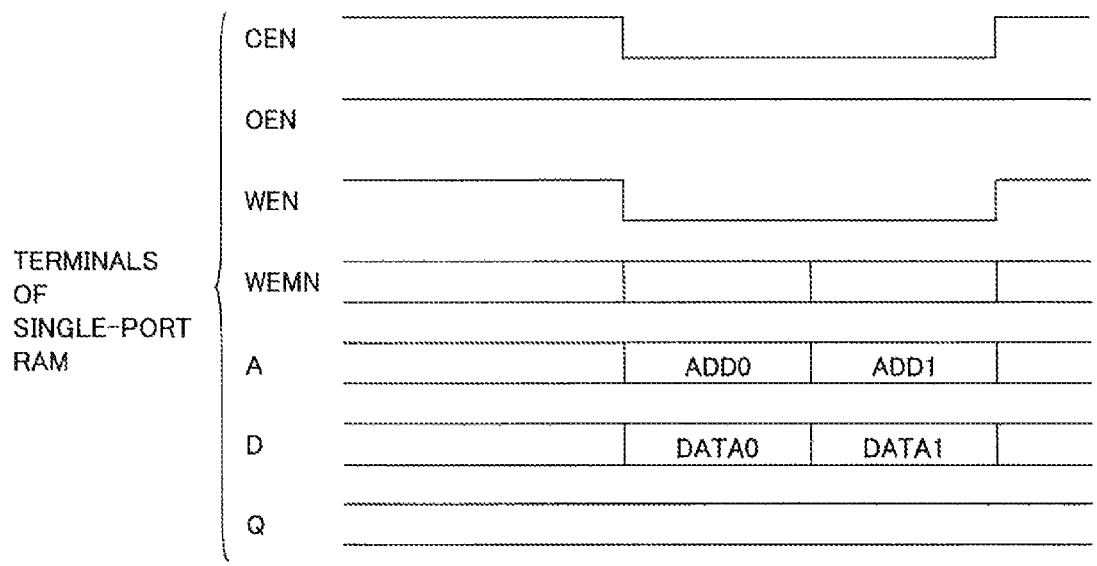
FIG. 6C is a time chart illustrating input and output waveforms at the terminal of the single-port RAM, when writing access contention occurs to the single-port RAM.

FIG. 4 illustrates the data that is stored in the single port RAM 11 when data is continuously read for a plurality of pages from the flash memory 300. When data is continuously read for n pages (n is an integer of 2 or greater), the page address "#1", "#2", "#3", . . . , and "#n" are sequentially stored from the address "0" in accordance with instructions from the CPU 40. Error information is also stored at the same address as the page address, in accordance with instructions from the ECC circuit 50. The operation of storing error information is described below with reference to FIG. 5.

The operation of the flash controller 100 when responding to a reading request from the host device 200 is described with reference to FIG. 5.

Firstly, for example, when the host device 200 starts to operate, the host device 200 issues a first reading request to the flash controller 100 (step S1). The reading request is generated as a single command for continuously reading a plurality of pages. The host interface 20 receives and passes the reading request to the CPU 40.

The CPU 40 sets (decides) page addresses in response to the reading request (step S2). Specifically, the CPU 40 sequentially stores the page addresses corresponding to page # indicated by the reading request from Address "0" in the single-port RAM 11 of the RAM block 10. The CPU 40 may perform a process of checking how many pages can be read (i.e., how many pages can be written in the RAM), and a process of converting between a logic page and a physical page.

Next, the CPU 40 issues continuous reading instructions, accompanied by the number of pages to be read, to the flash interface 30 (step S3).

The flash interface 30 reads the page address stored at the address "0" in the single-port RAM 11 in response to the continuous reading instructions. Then, the flash interface 30 issues a reading instruction accompanied by the page address, to the flash memory 300 and reads the data at the page address in the flash memory 300 (step S4). The flash interface 30 transmits the retrieved data to the ECC circuit 50.

The ECC circuit 50 applies an error detection process on the retrieved data. Then, the ECC circuit 50 performs an error correction process on the retrieved data when the ECC circuit 50 detects any error. On the other hand, the ECC circuit 50 transmits the retrieved data to the flash interface 30 without performing error correction when the ECC circuit 50 does not detect any errors. The ECC circuit 50 stores error information, representing the result of error detection, at the address "0" of the single-port RAM 11, upon finishing the error detection/correction for one page (step S5).

The error information is a logic value "1" when an error is detected, and is a logic value "0" when an error is not detected, for example. It is possible to write error information at the same address "0" as the data of the page address, while maintaining the data of the page address which has been written at the address "0", because the write enable mask signal WEMN to the single-port RAM 11 is used. This process associates the retrieved page address with the error information.

The flash interface 30 transmits the retrieved data to the host interface 20 after the error detection/correction by the ECC CIRCUIT 50. The host interface 20 transmits the retrieved data to the host device 200 (step S6).

The flash interface 30, the ECC circuit 50, and the host interface 20 repeat the processes from step S4 to step S6 for the following pages to be read. When a next page after the above-mentioned "one page" is read in this continuous reading, the flash interface 30 reads the next page address stored at the next address which is obtained by incrementing the current address that is just read.

For example, when the current reading address is "0", the page address that will be read next by the flash interface 30 is the page address stored at the address "1" which is obtained by increasing the address "0" of the single-port RAM 11 by one. When all the pages to be read, as requested by the reading request, are read, the flash interface 30 notifies the CPU 40 of this fact.

When the host device 200 obtains the data of all the pages requested by the reading request generated in step S1, then the host device 200 sends the second reading request to the flash controller 100 (step S7).

The CPU 40 accesses the single-port RAM 11 in response to the second reading request, and obtains the page address (es) that is (are) associated with the respective error information (step S8).

The CPU 40 sets the page addresses after obtaining the page addresses (step S9). This step is similar to step S2. The CPU 40 sends an instruction for continuous reading to the flash interface 30 within a predetermined time after receiving a reading request from the host device 200. Therefore, the CPU 40 generates an instruction for continuous reading after setting the page addresses of the first several pages (step S10), and then sets the page addresses of the remaining pages.

The flash interface 30 reads the data from the flash memory 300 in response to the instruction for continuous reading (step S11), in a similar manner as described above. The ECC circuit 50 performs the error detection on the retrieved data and then stores the error information representing the result of error detection at the corresponding address of the single-port RAM 11 (step S12), in a similar manner as described above.

As understood from the foregoing description, the writing access (step S9) for setting the page addresses by the CPU 40 and another writing access (step S12) for storing the error information by the ECC circuit 50 may contend with each other in the single-port RAM 11, as indicated by dotted-line oval in FIG. 5.

The operation of the RAM block 10 when writing access contention occurs in the single-port RAM is described hereafter with reference to FIGS. 6A, 6B, 6C and 2.

A RAM control signal from the flash interface 30 is introduced to one of the two inputs of the multiplexer 14. The RAM control signal, for example, may be generated by the ECC circuit 50 and sent to the RAM block 10 through the flash interface 30. When the NFI_CEN signal from the flash interface 30 is asserted in one cycle of a clock signal CLK (when the NFI_CEN signal becomes at an "L" level), the multiplexer 14 selects the RAM control signal from the flash interface 30 and supplies the RAM control signal to the single-port RAM 11. In the same cycle, the RAM control signal from the RAM control signal memory unit 13 is not outputted from the multiplexer 14. In other words, the multiplexer 14 supplies only the access from the flash interface 30 to the single-port RAM 11 in this one cycle.

The writing access signal from the CPU 40 is received by the CPU side interface 12. The RAM control signal memory unit 13 stores and keeps the writing access signal from the CPU 40 as a RAM control signal, when a standby instruction signal NFI_ACC supplied from the flash interface 30 is asserted (the standby instruction signal NFI_ACC becomes at an "H" level). The RAM control signal memory unit 13 keeps the RAM control signal at least till the next cycle. For example, the RAM control signal memory unit 13 includes a flip-flop circuit (not shown) and stores the RAM control signal in the flip-flop circuit. The RAM control signal memory unit 13 supplies the RAM control signal to the other input of the multiplexer 14. The standby instruction signal NFI_ACC is a pulse signal that is introduced in a cycle before the cycle in which the flash interface 30 performs writing access. Thus, the standby instruction signal NFI_ACC is generated from the flash interface 30 before asserting of the NFI_CEN signal.

The single-port RAM 11 performs a process that is requested by the RAM control signal from the flash interface 30, which is supplied from the multiplexer 14. The single-port RAM 11 stores data DATA0, i.e., a first data, represented by the data signal D, in the area ADD0 indicated by the address signal A, in the above-mentioned one cycle.

When the NFI_CEN signal is negated in or after the above-mentioned next cycle following the above-mentioned one cycle (i.e., when the NFI_CEN signal is inactive or disabled), the multiplexer 14 selects the RAM control signal from the RAM control signal memory unit 13 and supplies the RAM control signal to the single-port RAM 11. It is the negated state when the NFI_CEN signal becomes at the "H" level. The multiplexer 14 supplies only the access from the flash interface 30 to the single-port RAM 11 in the above-mentioned next cycle.

In this case, the single-port RAM 11 performs a process that is requested by the RAM control signal from the CPU 40, which is supplied from the multiplexer 14. The single-port RAM 11 stores data DATA1, i.e., a second data, represented by the data signal D, in the area ADD1 indicated by the address signal A, in the above-mentioned next cycle. The RAM control signal storage unit 13 deletes the content of the stored RAM control signal, in the following cycle or later.

The access from the flash interface 30 is given a priority by the above-described series of operations. Specifically, the address ADD0 and the address ADD1 sequentially reach the address terminal A of the single-port RAM 11. The data DATA0 and the data DATA1 sequentially reach the data terminal D of the single-port RAM 11. As such, even if two writing accesses are applied to the single-port RAM 11 from the flash interface 30 and the CPU 40 and these two writing accesses contend, the RAM block 10 can appropriately perform processes for these accesses.

As described above, the RAM block 10 temporarily stores the writing access signal from the CPU 40 when the standby instruction signal NFI_ACC signal is received from the flash interface 30. The later of the stored writing access signal and the writing access signal from the flash interface 30 is selected in response to the assertion of a selection instruction signal (NFI_CEN signal) from the outside. The selected writing access signal is supplied to the single-port RAM 11 in one cycle of the clock cycle, and the stored writing access signal (i.e., the writing access signal from the CPU 40) is supplied to the single-port RAM 11 in the next cycle following the above-mentioned one cycle (or later).

By these operations, the RAM block 10 can make the two accesses effective and respond to these accesses appropriately, even if access contention occurs in the single-port RAM 11.

It should be noted that the present invention is not limited to the described and illustrated embodiment. For example, although the data DATA1 is generated from the multiplexer 14 at the cycle immediately after the data DATA0 in the above-described embodiment, the present invention is not limited in this regard. The data DATA1 may be generated after a plurality of cycles of the data DATA0. This is the same for the addresses ADD0 and ADD1.

The above-described embodiment is configured to deal with writing access contention, but the concept of the present invention may also be applicable to a case where reading access contention occurs, and a similar advantage may result.

Although the target to be accessed is the single-port RAM in the illustrated embodiment, the concept of the present invention may also be applied to a case where the target to be accessed is a dual-port RAM, and a similar advantage may result. Since the single-port RAM needs an area that is about a half the area of the dual-port RAM, the single-port RAM is advantageous if a smaller mounting area (footprint) is preferred for the RAM.

This application is based on Japanese Patent Application No. 2011-231550 filed on Oct. 21, 2011, and the entire disclosure thereof is incorporated herein by reference.

What is claimed is:

1. A RAM memory device comprising:
a RAM that writes or reads data in synchronization with a clock signal in response to either a first access or a second access;
a flash side interface adapted to relay the first access including a first control signal and being supplied from a flash interface;
a processor side interface adapted to relay the second access including a second control signal and being supplied from a processor;
a RAM control signal storage that stores the second access having been relayed by the processor side interface in response to the first control signal; and
a multiplexer adapted to supply the first access having been relayed by the flash side interface to the RAM within one cycle of the clock signal in response to the first control signal, and to supply the second access which is stored in the RAM control signal storage to the RAM in or after a next cycle succeeding to said one cycle.

2. The RAM memory device of claim 1, wherein each of the first and second control signals includes a selection instruction signal and a standby instruction signal,
the multiplexer supplies the first access or the second access in response to the selection instruction signal, and
the RAM control signal storage stores the second access in response to the standby instruction signal included in the first control signal having been relayed by the flash side interface.

3. The RAM memory device of claim 1, wherein the RAM is a single-port RAM.

4. The RAM memory device of claim 1, wherein the first and/or second data includes a page address of a flash memory and error information of data retrieved from the flash memory.

5. The RAM memory device of claim 1, wherein the RAM memory device is included in a memory control device that controls a semiconductor memory device, and each of the first and second accesses is supplied from the memory control device in relation to control of the semiconductor memory device.

6. The RAM memory device of claim 4, wherein the first data of the first access includes the error information, and the second data of the second access includes error-free data provided from outside.

7. The RAM memory device of claim 1, wherein the RAM is a dual-port RAM.

8. The RAM memory device of claim 1, wherein the selection unit includes a multiplexer.

9. A memory control device connected between a host device and a memory unit for writing and reading desired data into and from the memory unit in response to a command from the host device, said memory control device comprising:
a host interface that interfaces to the host device;
a memory interface that interfaces to the memory unit; and
a RAM device connected between the host interface and the memory interface,
said RAM device including:
a RAM that writes or reads data in synchronization with a clock signal in response to either a first access or a second access;

a flash side interface adapted to relay the first access including a first control signal and being supplied from a flash interface;

a processor side interface adapted to relay the second access including a second control signal and being supplied from a processor;

a RAM control signal storage that stores that second access having been relayed by the processor side interface in response to the first control signal; and a multiplexer adapted to supply the first access having been relayed by the flash side interface to the RAM within one cycle of the clock signal in response to the first control signal, and to supply the second access which is stored in the RAM control signal storage to the RAM in or after a next cycle succeeding to said one cycle.

10. The memory control device of claim 9, wherein the memory unit is a flash memory.

11. The memory control device of claim 9, wherein the memory unit is a semiconductor memory device.

12. The memory control device of claim 9 further comprising an error check and correction (ECC) device for detecting and correcting error information in data supplied from the memory unit, before sending the data to the host device.

13. The memory control device of claim 9 further comprising an error check and correction (ECC) device for allotting a parity bit to data, if the desired data is to be written into the memory unit.

14. The memory control device of claim 9, wherein the RAM is a single-port RAM.

15. The memory control device of claim 9, wherein the RAM is a dual-port RAM.

16. The memory control device of claim 9, wherein the first and/or second data includes a page address of a flash memory and error information of data retrieved from the flash memory.

17. The memory control device of claim 9, wherein the selection unit includes a multiplexer.

* * * * *